United States Patent
Yang et al.

(10) Patent No.: US 11,800,560 B2
(45) Date of Patent: Oct. 24, 2023

(54) METHOD FOR TRANSMITTING AND RECEIVING SIGNAL IN WIRELESS COMMUNICATION SYSTEM SUPPORTING UNLICENSED BAND, AND APPARATUS SUPPORTING SAME

(71) Applicant: LG ELECTRONICS INC., Seoul (KR)

(72) Inventors: Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 17/267,205

(22) PCT Filed: Aug. 7, 2019

(86) PCT No.: PCT/KR2019/009883
§ 371 (c)(1),
(2) Date: Feb. 9, 2021

(87) PCT Pub. No.: WO2020/032575
PCT Pub. Date: Feb. 13, 2020

(65) Prior Publication Data
US 2022/0353909 A1 Nov. 3, 2022

(30) Foreign Application Priority Data
Aug. 10, 2018 (KR) .................. 10-2018-0094048

(51) Int. Cl.
*H04W 74/08* (2009.01)
*H04L 5/00* (2006.01)
(Continued)

(52) U.S. Cl.
CPC ....... *H04W 74/0808* (2013.01); *H04L 5/0053* (2013.01); *H04W 72/0446* (2013.01); *H04W 72/23* (2023.01)

(58) Field of Classification Search
CPC .......... H04W 74/0808; H04W 72/042; H04W 72/0446; H04W 72/1273; H04W 72/1278;
(Continued)

(56) References Cited

U.S. PATENT DOCUMENTS

2017/0150524 A1* 5/2017 Oh .................. H04W 72/0446
2017/0245302 A1* 8/2017 Mukherjee ............ H04W 16/14
(Continued)

FOREIGN PATENT DOCUMENTS

KR 20160094033 8/2016
WO 2018009037 1/2018
(Continued)

OTHER PUBLICATIONS

R1-1800163 HARQ-ACK and UL Scheduling Timing Relationship, MediaTek Inc. 3GPP TSG RAN WG1 Meeting AH 1801 Vancouver, Canada, Jan. 22-26, 2018 (Year: 2018).*
(Continued)

*Primary Examiner* — Ayaz R Sheikh
*Assistant Examiner* — David Zhijun Sun
(74) *Attorney, Agent, or Firm* — LEE HONG DEGERMAN KANG WAIMEY

(57) ABSTRACT

The present invention relates to a wireless communication system and, particularly, provides: a method for receiving a first downlink channel including downlink allocation information, receiving, on the basis of the downlink allocation information, a second downlink channel including data, and transmitting a response to the reception of the second downlink channel through an uplink channel by performing
(Continued)

channel sensing for one or more symbol candidates configured for uplink transmission; and an apparatus therefor.

2 Claims, 16 Drawing Sheets

(51) Int. Cl.
*H04W 72/0446* (2023.01)
*H04W 72/23* (2023.01)

(58) Field of Classification Search
CPC ... H04L 5/0053; H04L 1/1854; H04L 1/1896; H04L 5/00
See application file for complete search history.

(56) References Cited

U.S. PATENT DOCUMENTS

| | | | | |
|---|---|---|---|---|
| 2017/0325216 | A1* | 11/2017 | Nogami | H04L 1/1896 |
| 2018/0220428 | A1* | 8/2018 | Sun | H04W 72/082 |
| 2019/0349898 | A1* | 11/2019 | Fu | H04W 72/0453 |

FOREIGN PATENT DOCUMENTS

| | | | |
|---|---|---|---|
| WO | 2018031704 | 2/2018 | |
| WO | WO-2018173124 A1 * | 9/2018 | ........... H04L 1/1845 |

OTHER PUBLICATIONS

PCT International Application No. PCT/KR2019/009883, International Search Report dated Nov. 28, 2019, 18 pages.

Qualcomm Incorporated, "Summary of DL/UL scheduling and HARQ management," R1-1801124, 3GPP TSG-RAN WG1 Meeting AH 1801, Jan. 2018, 12 pages.

LG Electronics, "Discussion on HARQ process number for NR," R1-1710334, 3GPP TSG RAN WG1 Meeting NR Ad-Hoc#2, Jun. 2017, 7 pages.

* cited by examiner (a) Carrier aggregation between L-band and U-band (b) Standalone U-band(s)

(a)

(b)

(a)

(b)

(a)

(b)

METHOD FOR TRANSMITTING AND RECEIVING SIGNAL IN WIRELESS COMMUNICATION SYSTEM SUPPORTING UNLICENSED BAND, AND APPARATUS SUPPORTING SAME

CROSS-REFERENCE TO RELATED APPLICATIONS

This application is the National Stage filing under 35 U.S.C. 371 of International Application No. PCT/KR2019/009883, filed on Aug. 7, 2019, which claims the benefit of earlier filing date and right of priority to KR Application No. 10-2018-0094048 filed on Aug. 10, 2018, the contents of which is incorporated by reference herein in its entirety.

TECHNICAL FIELD

The present disclosure relates to a method and apparatus used in a wireless communication system and, more particularly, to a method of transmitting and receiving a signal in a wireless communication system supporting an unlicensed band and apparatus for supporting the same.

BACKGROUND ART

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

DISCLOSURE

Technical Problem

The object of the present disclosure is to provide a method of transmitting and receiving a signal in a wireless communication system supporting an unlicensed band and apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of transmitting and receiving a signal in a wireless communication system supporting an unlicensed band and apparatus for supporting the same.

In one aspect of the present disclosure, a communication method for an apparatus in a wireless communication system is provided. The communication method may include receiving a first downlink channel including downlink assignment information, receiving a second downlink channel including data based on the downlink assignment information, and transmitting a response to the reception of the second downlink channel via an uplink channel by performing channel sensing for one or more candidate symbols configured for uplink transmission. When the one or more candidate symbols satisfy a specific condition, the response may be determined as an acknowledgement (ACK) or a negative ACK (NACK) depending on decoding results of the received second downlink channel. When the one or more candidate symbols do not satisfy the specific condition, the response may be fixed to the NACK.

In another aspect of the present disclosure, an apparatus in a wireless communication system is provided. The apparatus may include a memory and a processor. The processor may be configured to receive a first downlink channel including downlink assignment information, receive a second downlink channel including data based on the downlink assignment information, and transmit a response to the reception of the second downlink channel via an uplink channel by performing channel sensing for one or more candidate symbols configured for uplink transmission. When the one or more candidate symbols satisfy a specific condition, the response may be determined as an acknowledgement (ACK) or a negative ACK (NACK) depending on decoding results of the received second downlink channel. When the one or more candidate symbols do not satisfy the specific condition, the response may be fixed to the NACK.

The first downlink channel may be a physical downlink control channel (PDCCH). The second downlink channel may be a physical downlink shared channel (PDSCH). The uplink channel may be a physical uplink control channel (PUCCH) or a physical uplink shared channel (PUSCH).

The specific condition may be that the time from the last symbol of the second downlink channel to the candidate symbol needs to be greater than or equal to a minimum processing time or that the number of symbols from the last symbol of the second downlink channel to the candidate symbol needs to be greater than or equal to the number of symbols required for the minimum processing time. The minimum processing time may be a minimum time or a minimum number of symbols from the last symbol of the second downlink channel to the first symbol of the uplink channel.

The number of the one or more candidate symbols may be one. In this case, if the one candidate symbol does not satisfy the specific condition, the transmission of the uplink channel may be dropped by skipping the channel sensing.

The number of the one or more candidate symbols may be two or more. In this case, if all of the two or more candidate symbols do not satisfy the specific condition, the transmission of the uplink channel may be dropped by skipping the channel sensing.

The number of the one or more candidate symbols may be two or more. In this case, if at least one symbol among the two or more candidate symbols satisfies the specific condition, the response to the reception of the second downlink channel may be transmitted via the uplink channel by performing the channel sensing only for the at least one symbol satisfying the specific condition.

The number of the one or more candidate symbols may be two or more. In this case, if at least one symbol among the two or more candidate symbols satisfies the specific condition, the method may include performing the channel sensing for the at least one symbol satisfying the specific condition and the remaining symbols not satisfying the specific condition, if the channel sensing is successful for the remaining symbols, transmitting a channel reservation signal from a symbol for which the channel sensing is successful to the at least one symbol; and transmitting the response to the reception of the second downlink channel in the at least one symbol via the uplink channel.

The apparatus may include an autonomous driving apparatus.

It will be understood by those skilled in the art that the above-described aspects of the present disclosure are merely part of the embodiments of the present disclosure and various modifications and alternatives could be developed from the following technical features of the present disclosure.

Advantageous Effects

According to the present disclosure, a user equipment (UE) may consider a processing time when transmitting an uplink channel in response to reception of a downlink channel, thereby reducing inefficiency in signal transmission due to a channel access procedure in an unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, illustrate embodiments of the present disclosure and together with the description serve to explain the principle of the present disclosure.

BEST MODE

Figure 1:
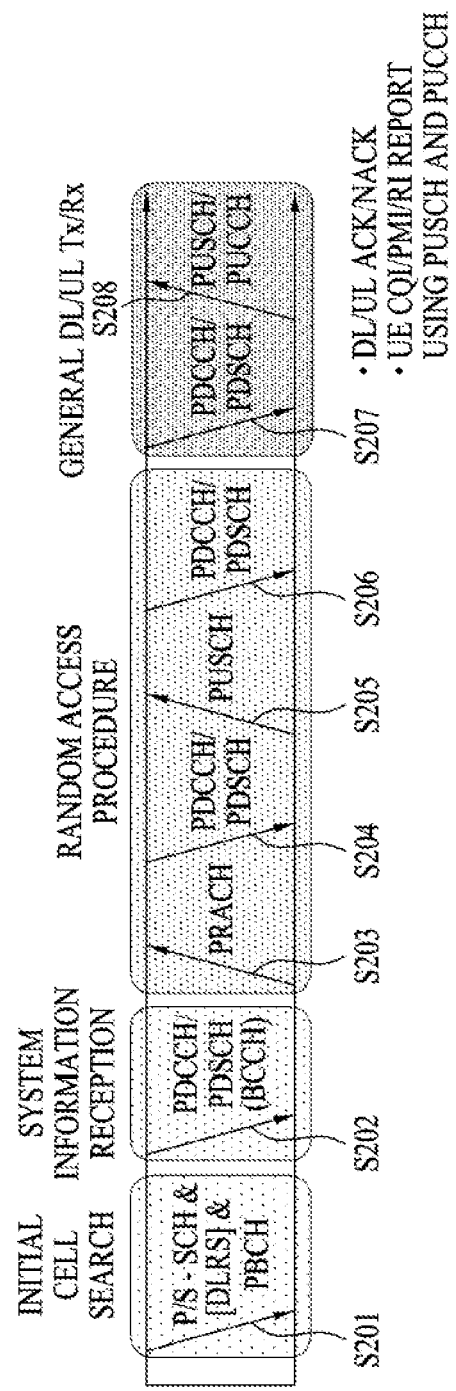
FIG. 1 illustrates physical channels and a general signal transmission method using the physical channels in a $3^{rd}$ generation partnership project (3GPP) system as an exemplary wireless communication system.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a mobile station (MS). The BS is a terminal node of a network, which communicates directly with an MS. In some cases, a specific operation described as performed by the BS may be performed by an upper node of the BS.

That is, in the network including a plurality of network nodes including the BS, various operations performed for communication with the MS may be performed by the BS or network nodes other than the BS. In the present disclosure, the term BS may be replaced with the term fixed station, Node B, evolved Node B (eNode B or eNB), gNode B (gNB), advanced base station (ABS), or access point. Further, the term BS may cover remote radio head (RRH), eNB, transmission point (TP), reception point (RP), and relay in its broad sense.

In the embodiments of the present disclosure, the term terminal may be replaced with the term user equipment (UE), MS, subscriber station (SS), mobile subscriber station (MSS), mobile terminal, or advanced mobile station (AMS).

Techniques described herein may be used in various wireless access systems such as code division multiple access (CDMA), frequency division multiple access (FDMA), time division multiple access (TDMA), orthogonal frequency division multiple access (OFDMA), and single carrier-frequency division multiple access (SC-FDMA). CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, and evolved-UTRA (E-UTRA). UTRA is a part of universal mobile telecommunications system (UMTS). 3rd generation partnership project (3GPP) LTE is a part of Evolved UMTS (E-UMTS) using E-UTRA. 3GPP LTE employs OFDMA for DL and SC-FDMA for UL. LTE-A/LTE-A pro is an evolution of 3GPP LTE. 3GPP new radio or new radio access technology (NR) is an evolution of 3GPP LTE/LTE-A/LTE-A pro.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

In an unlicensed band of the NR system, the random access procedure may be performed in two steps. For example, the UE may transmit Message 1 to the BS and receive Message 2 from the BS in response to Message 1. In this case, Message 1 may be a combination of the preamble (S13) and PUSCH transmission (S15), and Message 2 may be a combination of the RAR (S14) and collision resolution message (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
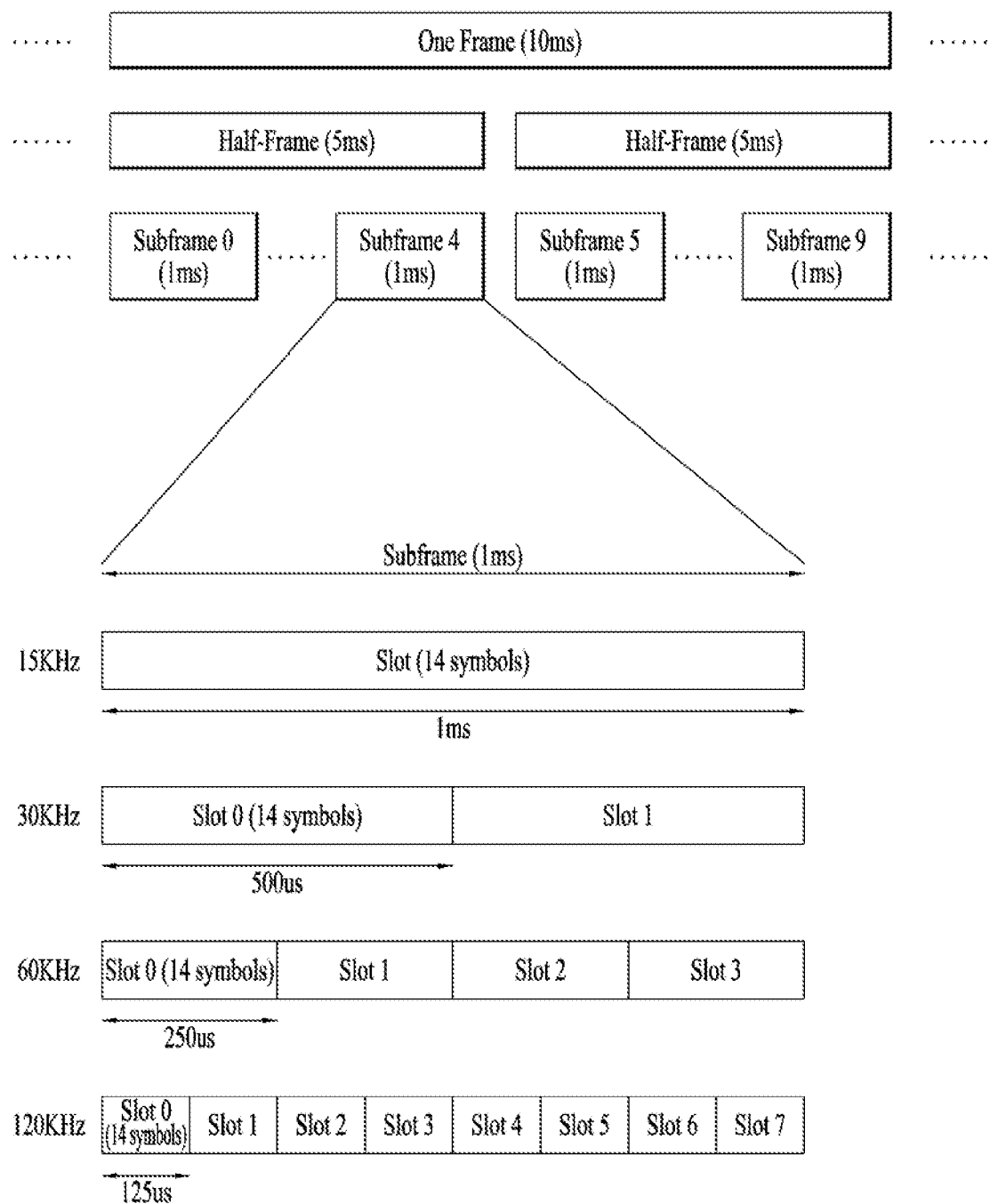
FIG. 2 illustrates a radio frame structure.

FIG. 2 is a diagram illustrating the structure of a radio frame in the NR system to which embodiments of the present disclosure are applicable In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

In the NR system, different OFDM(A) numerologies (e.g., SCS, CP length, etc.) may be configured for a plurality of cells aggregated for one UE. Thus, the (absolute time) duration of a time resource (e.g., subframe (SF), slot, or TTI) including the same number of symbols may differ between the aggregated cells (for convenience of description, such a time resource is commonly referred to as a time unit (TU)).

Figure 3:
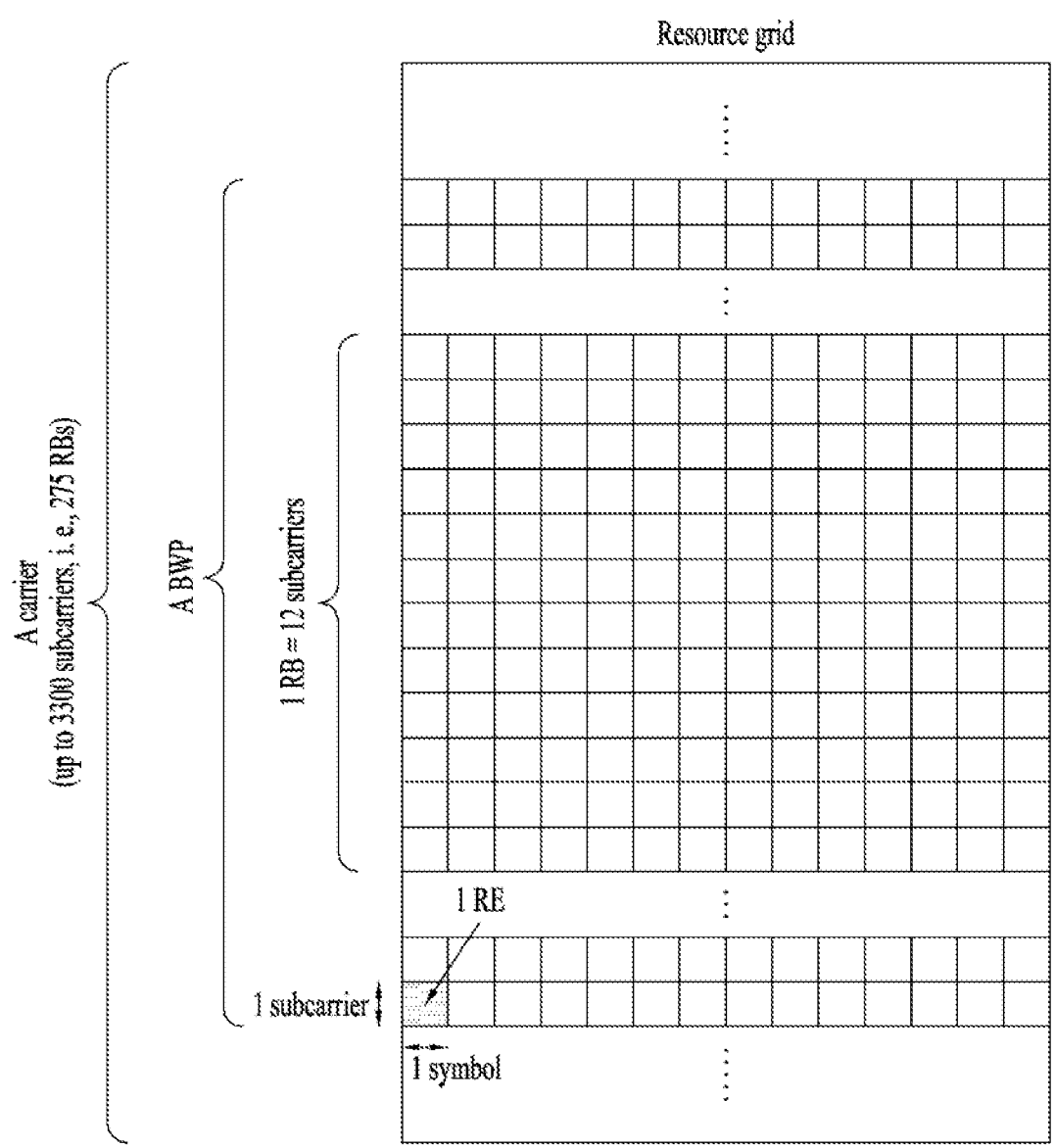
FIG. 3 illustrates a resource grid during the duration of a slot.

FIG. 3 illustrates a resource grid of a slot.

One slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
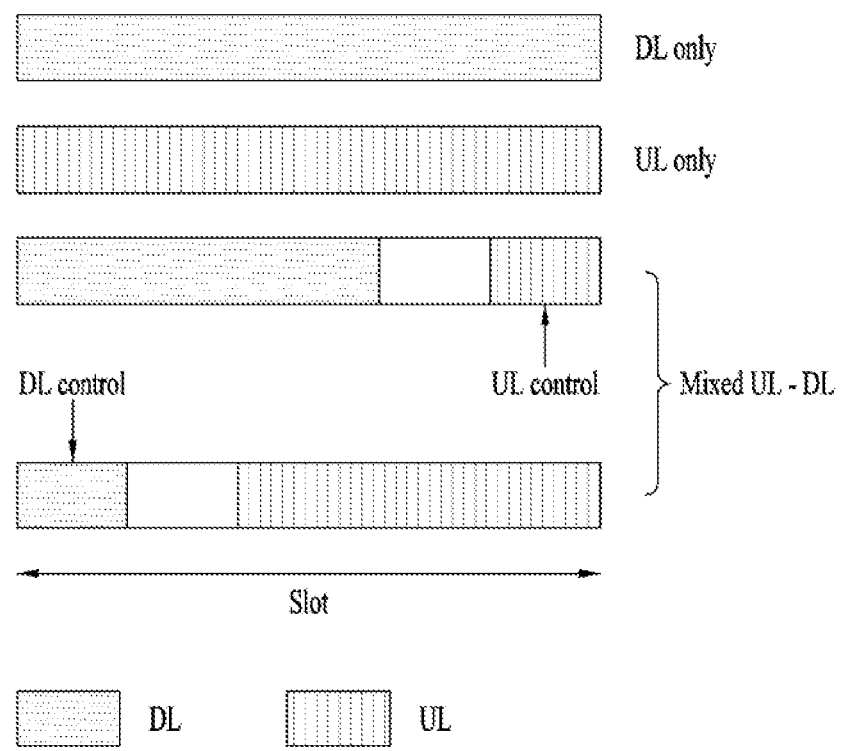
FIG. 4 illustrates a self-contained slot structure.

FIG. 4 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

Figure 5:
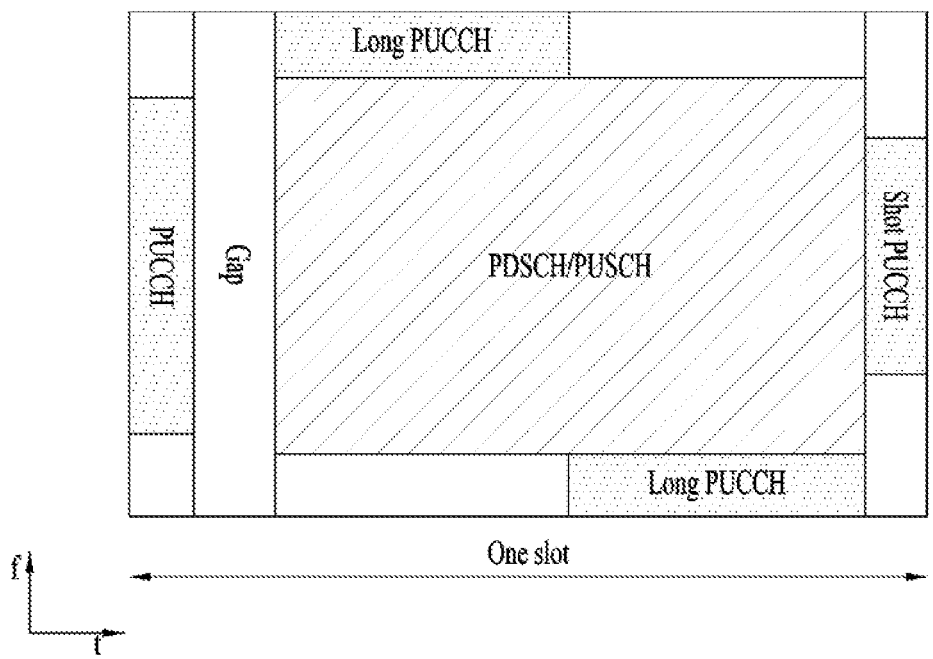
FIG. 5 illustrates mapping of physical channels in a self-contained slot.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region FIG. 5 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.
monitoringSlotPeriodicityAndOffset: this indicates a PDCCH monitoring periodicity (on a slot basis) and a PDCCH monitoring period offset (on a slot basis).
monitoringSymbolsWithinSlot: this indicates PDCCH monitoring symbols in a slot (e.g., first symbol(s) in the CORESET).
nrofCandidates: this denotes the number of PDCCH candidates for each AL={1, 2, 4, 8, 16} (one of 0, 1, 2, 3, 4, 5, 6, and 8).

An occasion (e.g., time/frequency resource) for monitoring PDCCH candidates is defined as a PDCCH (monitoring) occasion. One or more PDCCH (monitoring) occasions may be configured in a slot.

Table 1 shows the characteristics of each SS.

TABLE 1

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 2 shows DCI formats transmitted on the PDCCH.

TABLE 2

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 10 may be referred to as fallback DCI formats, whereas DCI format 0_1 and DCI format 11 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.
SR: information used to request UL-SCH resources.
HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.
CSI: feedback information for a DL channel. Multiple input multiple output (MIMO)-related feedback information includes an RI and a PMI.

Table 3 illustrates exemplary PUCCH formats. PUCCH formats may be divided into short PUCCHs (Formats 0 and 2) and long PUCCHs (Formats 1, 3, and 4) based on PUCCH transmission durations.

TABLE 3

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

Figure 6:
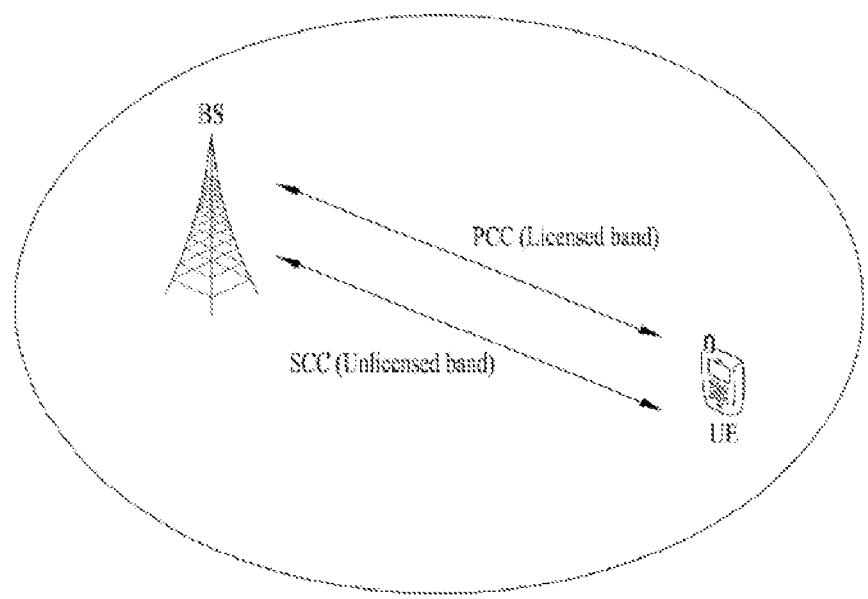
FIG. 6 illustrates a wireless communication system supporting an unlicensed band.
Figure 6:
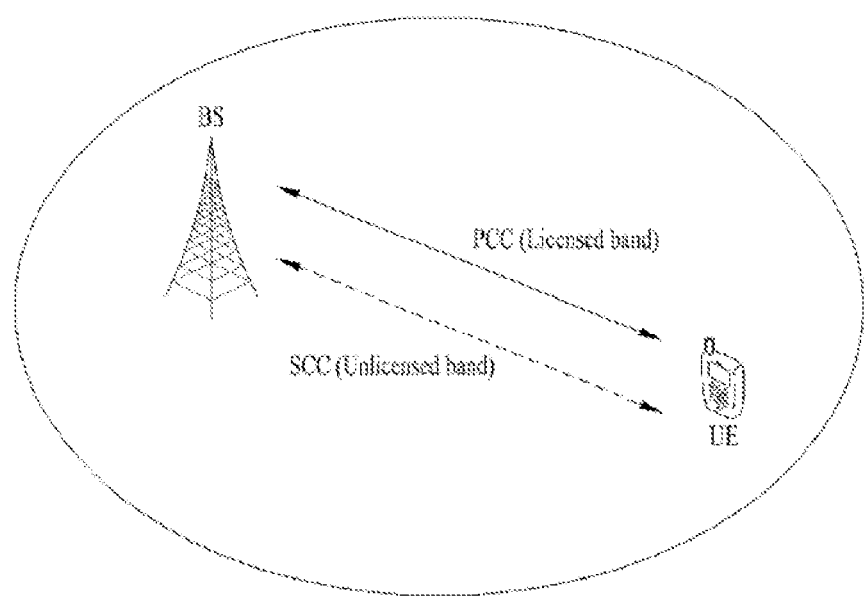

FIG. 6 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 6 (a) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 6 (a) corresponds to the LAA of the 3GPP LTE system. FIG. 6 (b) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) transmission. When the other communication node(s) perform no signal perform signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The series of processes described above may be referred to as Listen-Before-Talk (LBT) or a channel access procedure (CAP). The LBT may be interchangeably used with the CAP.

Specifically, a plurality of CAP types may be defined for UL transmission in the U-band. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 7:
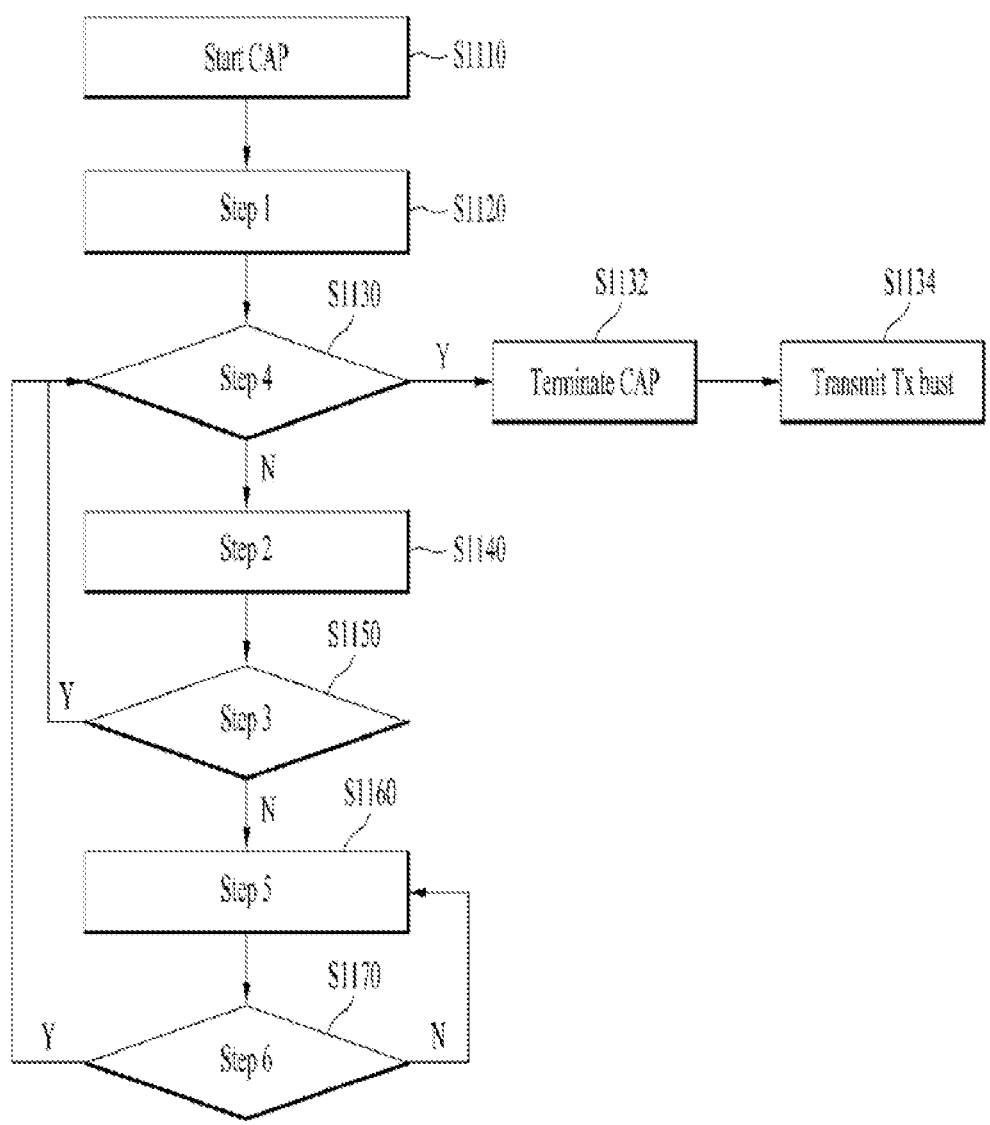
FIG. 7 illustrates an exemplary channel access procedure of a UE for UL signal transmission in an unlicensed band applicable to the present disclosure.

FIG. 7 is a flowchart illustrating UE's Type 1 CAP operation for UL signal transmission.

To transmit a signal in the U-band, the UE may initiate a CAP (S1110). The UE may randomly select a backoff counter N within a contention window (CW) according to step 1. In this case, N is set to an initial value $N_{init}$ (S1120). $N_{init}$ may have a random value between 0 and $CW_p$. If it is determined according to step 4 that the backoff counter value (N) is 0 (YES in S1130), the UE terminates the CAP (S1132). Then, the UE may perform Tx burst transmission (S1134). If the backoff counter value is non-zero (NO in S1130), the UE decreases the backoff counter value by 1 according to step 2 (S1140). The UE checks whether the channel of U-cell(s) is idle (S1150). If the channel is idle (YES in S1150), the UE checks whether the backoff counter value is 0 (S1130). On the contrary, if the channel is not idle in S1150, that is, if the channel is busy (NO in S1150), the UE checks whether the corresponding channel is idle for a defer duration Ta (longer than or equal to 25 usec), which is longer than a slot duration (e.g., 9 usec), according to step 5 (S1160). If the channel is idle for the defer duration (YES in S1170), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1170), the UE performs step S1160 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1,2,3,4}. Otherwise, the UE may increase $CW_p$ for every priority class p∈{1,2,3,4} to a next higher allowed value.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

In 3GPP NR, a minimum UE processing time is defined for HARQ operation. The minimum UE processing time refers to the minimum time (e.g., the number of symbols) that should be guaranteed to the UE for signal reception, signal processing, and signal transmission. Specifically, the minimum UE processing time related to DL/UL HARQ operation may be defined as N1/N2.

Before describing embodiments of the present disclosure, the following terms and expressions used herein are defined as follows.

UL grant PDCCH: it refers to a PDCCH carrying a UL grant. For example, the UL grant PDCCH means a PDCCH carrying DCI format 0_0 or 0_1.

DL grant PDCCH: it refers to a PDCCH carrying a DL grant. For example, the DL grant PDCCH means a PDCCH carrying DCI format 1_0 or 1_1.

Slot: it refers to a basic time unit (TU) (or time interval) for data scheduling. The slot includes a plurality of symbols. Here, the symbol includes an OFDM-based symbol (e.g., CP-OFDM symbol, DFT-s-OFDM symbol, etc.). In this document, the symbol is interchangeable with the OFDM-based symbol, OFDM symbol, CP-OFDM symbol, and/or DFT-s-OFDM symbol.

The LBT is performed on/for channel X: it means that the LBT is performed to check whether transmission is capable of being performed on channel X. For example, the CAP may be performed before start of transmission on channel X (see FIG. 7).

The LBT is performed in/on/for symbol X: it means that the LBT is performed to check whether transmission is capable of being started on symbol X. For example, the CAP may be performed on symbol(s) before symbol X (see FIG. 7).

Figure 8:
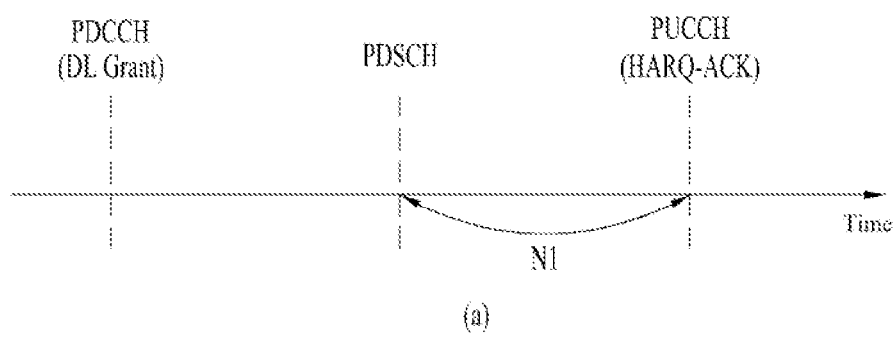
FIG. 8 illustrates a minimum user equipment (UE) processing time.
Figure 8:
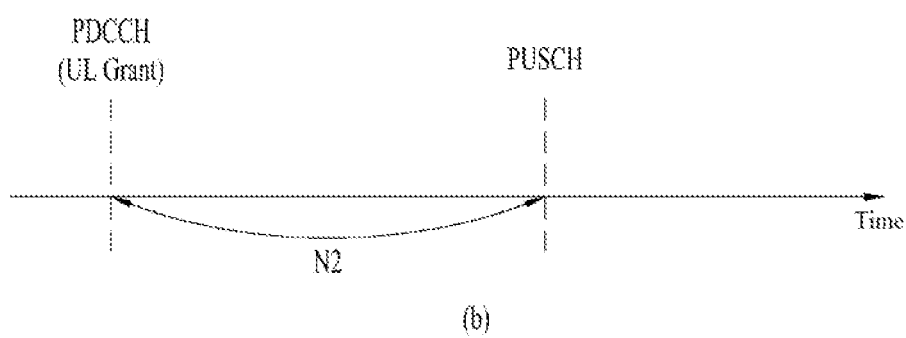

Referring to FIG. 8 (a), N1 denotes a minimum time required for the UE to prepare a HARQ-ACK. Specifically, N1 may be defined as a minimum time interval (e.g., the number of symbols) between reception of the PDSCH (e.g., reception of the last symbol) at the UE and transmission of the PUCCH/PUSCH including a HARQ-ACK for the PDSCH (e.g., transmission of the first symbol of the PUCCH/PUSCH carrying the HARQ-ACK or the first symbol in/to which the HARQ-ACK is transmitted/mapped).

Referring to FIG. 8 (b), N2 denotes a minimum time required for the UE to prepare the PUSCH. Specifically, N2 may be defined as a minimum time interval (e.g., the number of symbols) between reception of the UL grant PDCCH (e.g., reception of the last symbol) at the UE and transmission of the PUSCH for the UL grant PDCCH (e.g., transmission of the starting symbol).

When N1 is not satisfied (e.g., when an interval between the PDSCH ending symbol and the HARQ-ACK starting symbol is less than N1), the UE may be configured to transmit an invalid HARQ-ACK response (e.g., NACK) (via a scheduled/indicated PUCCH/PUSCH).

When N2 is not satisfied (e.g., when an interval between the PDCCH ending symbol and PUSCH starting symbol is less than N2), the UE may be configured to discard the corresponding PDCCH and drop the PUSCH transmission. Here, discarding the PDCCH may include discarding/skipping the operation indicated by the PDCCH.

Considering inefficiency due to LBT failure in the U-band (transmission dropping due to the LBT failure), a plurality of (different) candidate transmission (TX) starting symbols may be configured so as to give a plurality of LBT occasions to one UL channel (e.g., PUCCH/PUSCH). According to LBT results, the actual transmission starting symbol of the UL channel may be determined from among the plurality of candidate transmission starting symbols. When a plurality of candidate transmission starting symbols are configured, it may need to be considered how the UE checks a processing time (e.g., N1/N2) (for example, whether the UE checks the processing time by assuming that initial LBT is successful for the earliest candidate transmission starting symbol or considering that the LBT is unsuccessful). For example, when two candidate transmission starting symbol: symbols #1 and #2 are configured, N1/N2 may not be satisfied if symbol #1 is the transmission starting symbol. However, N1/N2 may be satisfied if symbol #2 is the transmission starting symbol.

Accordingly, the present disclosure proposes processing time checks in the U-band and UE operation methods based thereon and, more particularly, processing time checks based on a plurality of starting symbol configurations in consideration of the LBT operation in the U-band and UE operation methods based thereon. The methods proposed in the present disclosure are not limited to an operation/process for transmitting a PUCCH carrying a HARQ-ACK and a PUSCH including a UL-SCH, which are related to HARQ transmission and reception. That is, the proposed methods may be applied to an operation/process for transmitting HARQ-ACK feedback through piggybacking on the PUSCH or transmitting CSI feedback on the PUCCH/PUSCH. Further, the proposed methods are not limited to U-band operations based on the LBT. That is, the proposed methods may be applied to L-band (or U-band) operations with no LBT. Herein, the term "band" may be interchangeably used with the term "CC/cell". In addition, a CC/cell (index) may refer to a BWP (index) configured in the CC/cell or a combination of the CC/cell (index) and BWP (index).

Each of the proposed methods, which will be described hereinbelow, may be applied together with other proposed methods unless they collide with each other.

Processing Time and UE Operation for HARQ-ACK Transmission

Figure 9:
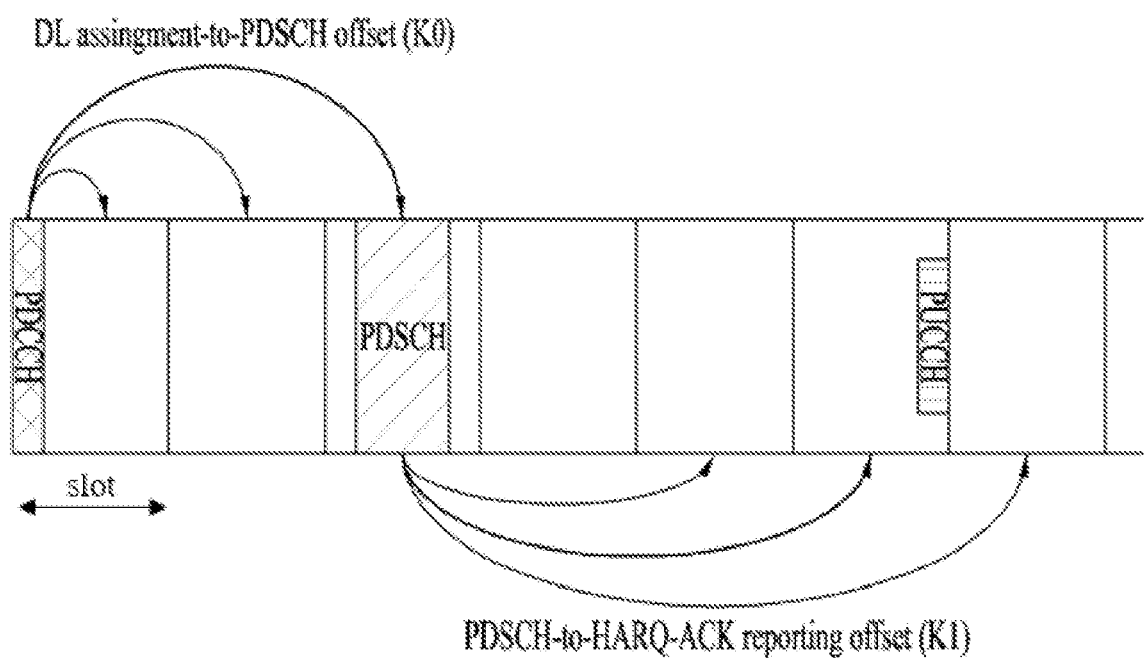
FIG. 9 illustrates a process for transmitting an acknowledgement/negative-acknowledgement (ACK/NACK)

FIG. 9 illustrates an ACK/NACK transmission process. Referring to FIG. 9, the UE may detect the PDCCH from slot #n. The PDCCH includes downlink scheduling information (e.g., DCI format 1_0 or 11) and indicates a DL assignment-to-PDSCH offset (K0) and a PDSCH-to-HARQ-ACK reporting offset (K1).

After receiving the PDSCH in slot #(n+K0) based on the scheduling information in slot #n, the UE may transmit UCI in slot #(n+K1) via the PUCCH. The UCI includes a HARQ-ACK response for the PDSCH. When the PDSCH is configured to carry a maximum of one TB, the HARQ-ACK response may be one bit. When the PDSCH is configured to carry a maximum of two TBs, the HARQ-ACK response may be two bits if no spatial bundling is configured. If spatial bundling is configured, the HARQ-ACK response may be one bit. If the HARQ-ACK transmission time for a plurality of PDSCHs is set to slot #(n+K1), the UCI transmitted in slot #(n+K1) may include HARQ-ACK responses for the plurality of PDSCHs. When a PUCCH resource overlaps with a PUSCH resource in a slot and when simultaneous transmission of the PUCCH-PUSCH is not configured, UCI may be transmitted via the PUSCH (UCI piggyback or PUSCH piggyback).

Hereinafter, a description will be given of how the UE operates when one or more candidate transmission starting symbols are configured for HARQ-ACK transmission in the U-band. In this case, the candidate transmission starting symbol may be predefined with respect to a PUCCH (or PUSCH) starting symbol or indicated by a higher layer signal (e.g., RRC signal) or UL scheduling information. For example, a plurality of candidate sets may be configured for the one or more candidate transmission starting symbols by a higher layer signal, and one of the plurality of candidate sets may be provided to the UE in DCI including UL scheduling information.

First, when one transmission starting symbol is configured for the HARQ-ACK (PUCCH) transmission, the following options may be considered for an N1 processing time check and UE operation method.

1) Option 1-1

A. When the configured transmission starting symbol does not satisfy N1, the UE may perform the LBT for the transmission starting symbol. If the LBT is successful, the UE may transmit an invalid HARQ-ACK response (e.g., NACK). Here, the invalid HARQ-ACK response refers to a fixed response regardless of PDSCH decoding results, and the invalid HARQ-ACK response may be fixed to the NACK.

B. When the configured transmission starting symbol satisfies N1, the UE may be configured to perform the LBT and transmit a valid HARQ-ACK response. Here, the valid HARQ-ACK response refers to a response based on PDSCH decoding results. That is, from the perspective of the UE, since the minimum time N1 required for HARQ-ACK preparation is satisfied, the UE may transmit the valid HARQ-ACK response based on the decoding result. For example, the UE may transmit an ACK or NACK.

According to Option 1-1-A, when the transmission starting symbol does not satisfy N1, the UE may transmit the NACK so that the BS may confirm that the UE receives the DL grant PDCCH.

2) Option 1-2

A. When the configured transmission starting symbol does not satisfy N1, the UE may not perform the LBT for the transmission starting symbol. That is, the UE may be configured to drop HARQ-ACK feedback (PUCCH) transmission in response to PDSCH reception. In this case, the UE may skip PDSCH decoding as well.

B. When the configured transmission starting symbol satisfies N1, the UE may be configured to perform the LBT and transmit a valid HARQ-ACK response.

In Option 1-2-A, no invalid HARQ-ACK response (e.g., NACK) is transmitted unlike Option 1-1-A. In this case, the BS may increase PDCCH/PDSCH transmission power, retransmit the PDCCH/PDSCH, or adjust the MCS. In Option 1-2-A, since the UE performs no LBT, the UE may avoid unnecessarily performing the LBT.

When a plurality of candidate transmission starting symbols are configured for the HARQ-ACK (PUCCH) transmission, the following options may be considered for the N1 processing time check and UE operation method.

1) Option 2-1

A. When at least one (or the earliest) candidate transmission starting symbol does not satisfy N1, the UE may i) perform the LBT and transmit the invalid HARQ-ACK response (e.g., NACK) or ii) perform no LBT and drop the HARQ-ACK feedback (PUCCH) transmission.

For example, when even one candidate transmission starting symbol does not satisfy N1, the UE may operate in the same way as when all candidate transmission starting symbols do not satisfy N1. When the at least one candidate transmission starting symbol is the earliest transmission starting symbol and the earliest transmission starting symbol does not satisfy N1, the UE may operate in the same way as Option 1-1-A or 1-2-A. That is, the UE may operate in the same way as when one candidate transmission starting symbol is configured and the configured candidate transmission starting symbol does not satisfy N1, without consideration of other candidate symbols.

B. When all candidate transmission starting symbols or the earliest candidate transmission starting symbol satisfies N1, the UE may be configured to transmit the valid HARQ-ACK response (by performing the LBT). That is, when the earliest candidate transmission starting symbol satisfies N1, it may be interpreted to mean that all candidate transmission starting symbols satisfy N1. Thus, the UE may transmit the valid HARQ-ACK response by performing the LBT. Specifically, the UE may sequentially perform the LBT for each candidate symbol until the LBT is successful, starting from the first candidate symbol. When there is a candidate symbol for which the LBT is successful, the UE may start the HARQ-ACK feedback (PUCCH) transmission from the symbol where the LBT is successful. When the LBT is unsuccessful for all candidate symbols, the UE may drop the PUCCH transmission.

2) Option 2-2

A. When at least one (or the latest) candidate transmission starting symbol satisfies N1, the UE may be configured to transmit the valid HARQ-ACK response. To transmit the HARQ-ACK feedback, the UE may perform the LBT only for candidate transmission starting symbol(s) that satisfy N1. In other words, the UE may skip the LBT for candidate symbol(s) that do not satisfy N1.

Specifically, when a plurality of candidate transmission starting symbols are configured, if at least one symbol satisfies N1, the UE may perform the LBT therefor. If the LBT is successful, the UE may transmit the valid HARQ-ACK response to the BS. In this case, since the LBT is performed only for transmission starting symbols that satisfy N1, the UE may avoid unnecessarily performing the LBT.

B. When all candidate transmission starting symbols (or the latest candidate transmission starting symbol) do not satisfy N1, the UE may be configured to i) perform the LBT and transmit the invalid HARQ-ACK response (e.g., NACK) or ii) perform no LBT and drop the HARQ-ACK feedback (PUCCH) transmission.

That is, when a plurality of candidate transmission starting symbols are configured, if all of the candidate transmission starting symbols do not satisfy N1, the UE may operate in the same way as Option 1-1-A or 1-2-A. That is, the UE may operate in the same way as when one candidate transmission starting symbol is configured and the configured candidate transmission starting symbol does not satisfy N1.

3) Option 2-3

A. When at least one (or the latest) candidate transmission starting symbol satisfies N1, the UE may be configured to transmit the valid HARQ-ACK response. To transmit the HARQ-ACK feedback, the UE may perform the LBT for all candidate transmission starting symbols including candidate transmission starting symbol(s) that do not satisfy N1. If the UE succeeds in the LBT for the candidate transmission starting symbol(s) that do not satisfy N1, the UE may transmit a channel reservation signal from the time at which the LBT is successful to the earliest transmission starting symbol that satisfies N1, symbol X. Then, the UE may start the HARQ-ACK feedback (PUCCH) transmission from symbol X.

That is, when a plurality of candidate transmission starting symbols are configured, if at least one candidate symbol satisfies N1, the UE may perform the LBT and transmit the valid HARQ-ACK response to the BS. In this case, the LBT may be performed for all of the plurality of candidate transmission starting symbols, unlike Option 2-2-A. Assuming that a transmission starting symbol that satisfies N1 is symbol X (when there are a plurality of transmission starting symbols that satisfy N1, the earliest symbol is assumed to be symbol X), if the UE succeeds in the LBT at a time before symbol X, the UE may transmit the channel reservation signal from the time at which the LBT is successful to symbol X. Then, the UE may start the HARQ-ACK feedback (PUCCH) transmission from symbol X.

B. When all candidate transmission starting symbols (or the latest candidate transmission starting symbol) do not satisfy N1, the UE may be configured to i) perform the LBT and transmit the invalid HARQ-ACK response (e.g., NACK) or ii) perform no LBT and drop the HARQ-ACK feedback (PUCCH) transmission.

That is, when a plurality of candidate transmission starting symbols are configured, if all of the candidate starting symbols do not satisfy N1, the UE may operate in the same way as Option 1-1-A or 1-2-A. That is, the UE may operate in the same way as when one candidate transmission starting symbol is configured and the configured candidate transmission starting symbol does not satisfy N1.

Hereinafter, a description will be given of a UL channel transmission process according to embodiments of the present disclosure. More particularly, a UL channel transmission process including the processing time N1 and HARQ-ACK feedback will be described with reference to FIGS. 10 to 12.

Figure 10:
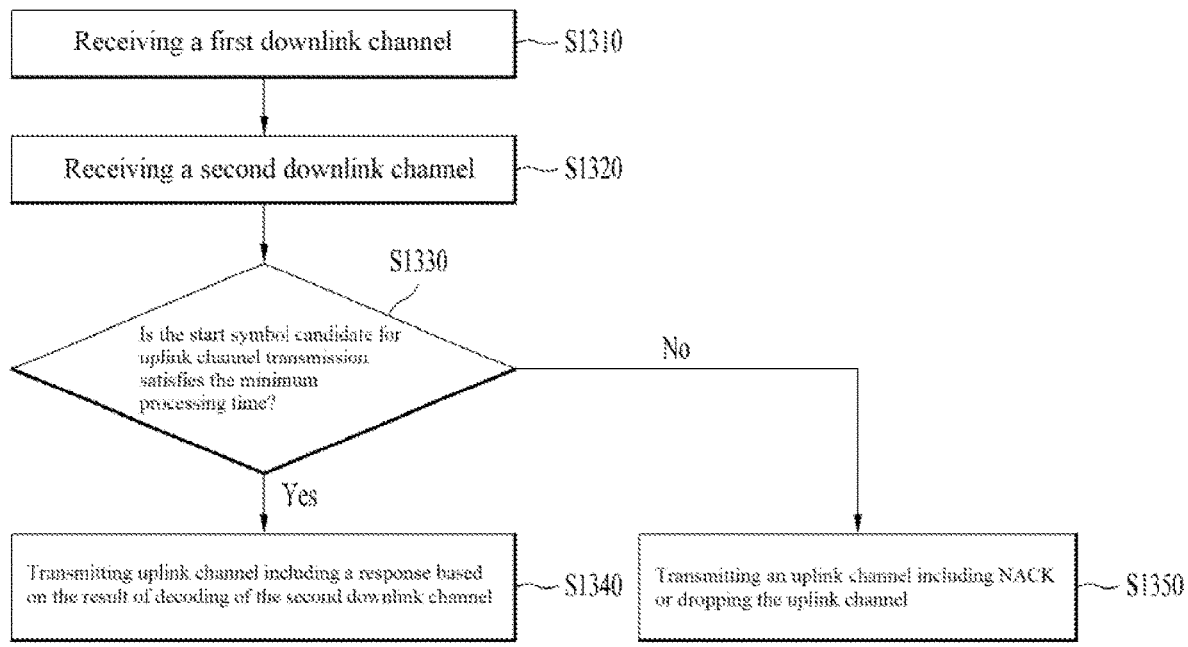
FIGS. 10 to 12 illustrate uplink channel transmission processes to which embodiments of the present disclosure are applied.

Referring to FIG. 10, the UE may receive a first DL channel from the BS (S1310). The first DL channel may be a control channel (e.g., PDCCH) including the DL grant.

Next, the UE may receive a second DL channel from the BS based on the DL grant (S1320). The second DL channel may be a data channel (e.g., PDSCH) including data.

The UE may transmit a UL channel including HARQ-ACK feedback information in response to the reception of the first and second DL channels. In this case, depending on whether a starting symbol for UL channel transmission satisfies the minimum processing time N1 (S1330), the UE may perform the UL channel transmission in different ways. The starting symbol for the UL channel transmission may be predefined or indicated by a higher layer signal (e.g., RRC signal) or UL scheduling information. Specifically, one starting symbol may be configured (Options 1-1 and 1-2), or a plurality of candidate transmission starting symbols may be configured (Options 2-1 to 2-3).

If a candidate starting symbol for the UL channel transmission satisfies N1, the UE may transmit a UL channel including a HARQ-ACK response based on decoding results of the received second DL channel (S1340).

If the candidate starting symbol for the UL channel transmission does not satisfies N1, the UE may transmit a UL channel including an invalid HARQ-ACK response (e.g., NACK) or drop the UL channel transmission (S1350).

Figure 11:
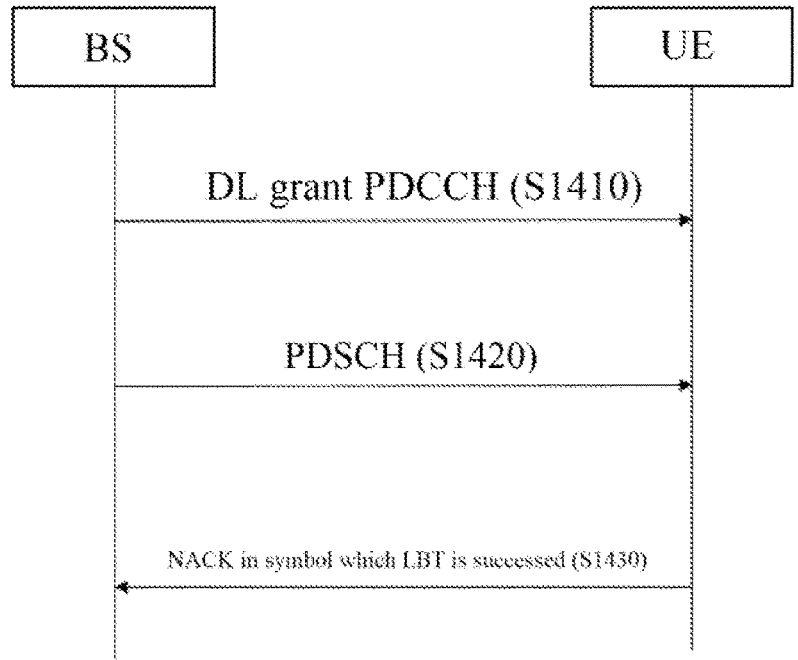
Figure 11:
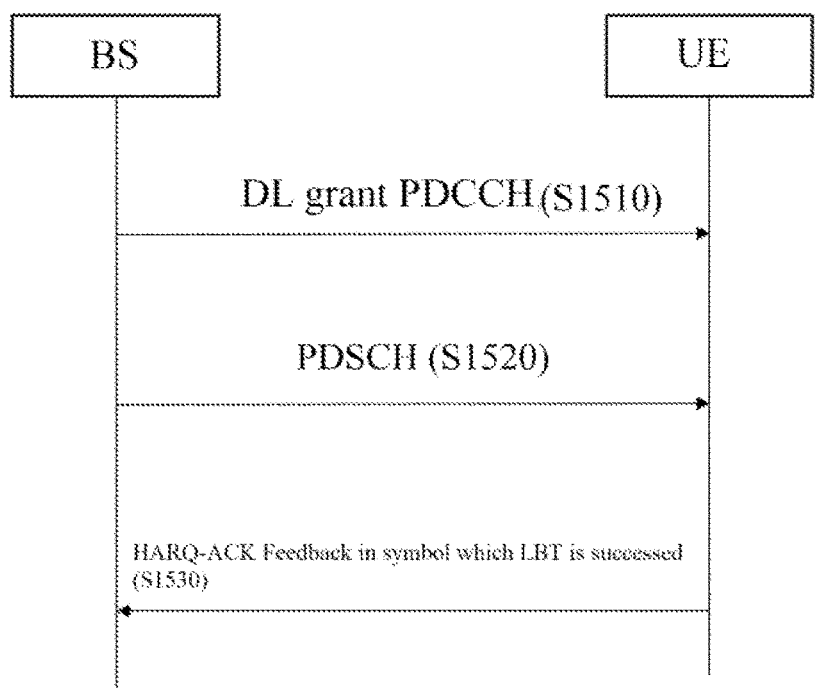

Referring to FIG. 11, the UE may receive the DL grant PDCCH from the BS (S1410 and S1510) and then also receive the PDSCH based on the DL grant (S1420 and S1520). Thereafter, the UE may initiate a UL transmission process by considering candidate transmission starting symbol(s) for the LBT and the processing time N1 for HARQ-ACK transmission.

If all of one or more candidate transmission starting symbols do not satisfy N1, the UE may perform the LBT and transmit a response fixed to the NACK to the BS in a symbol where the LBT is successful (S1430). Alternatively, the UE may drop HARQ-ACK feedback (PUCCH) transmission (see Option 1-1-A, 1-2-A, 2-1-A, 2-2-B, and/or 2-3-B).

On the other hand, if any one of the one or more candidate transmission starting symbols satisfy N1, the UE may perform the LBT and transmit HARQ-ACK feedback (PUCCH) to the BS in a symbol where the LBT is successful (S1530). That is, the UE may decode the received PDSCH and then transmit ACK/NACK feedback based on decoding results. Specifically, if the UE succeeds in the LBT for a symbol, the UE may start the HARQ-ACK feedback (PUCCH) transmission from the symbol where the LBT is successful. If the UE fails in the LBT for all candidate symbols, the UE may drop the PUCCH transmission (see Option 1-1-B, 1-2-B, 2-1-B, 2-2-A, and/or 2-3-A).

In the U-band, one or at least two candidate transmission starting symbols may be configured for UL channel transmission to give a plurality of LBT occasions for the UL channel transmission.

Hereinafter, a case in which one candidate transmission starting symbol is configured and a case in which two or more candidate transmission starting symbols are configured will be described separately with reference to FIG. 12.

Figure 12:
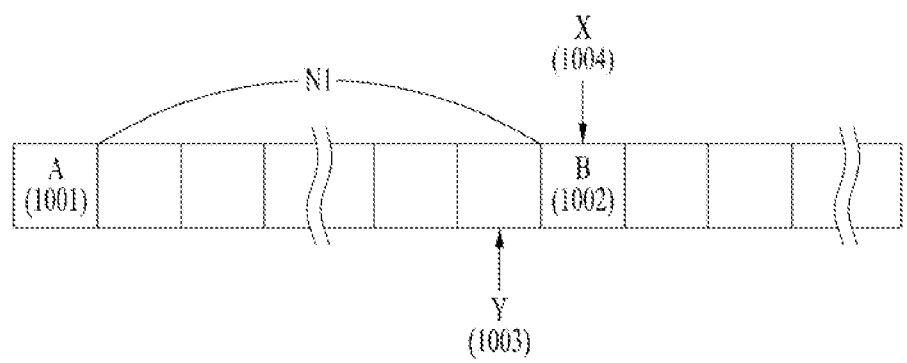
Figure 12:
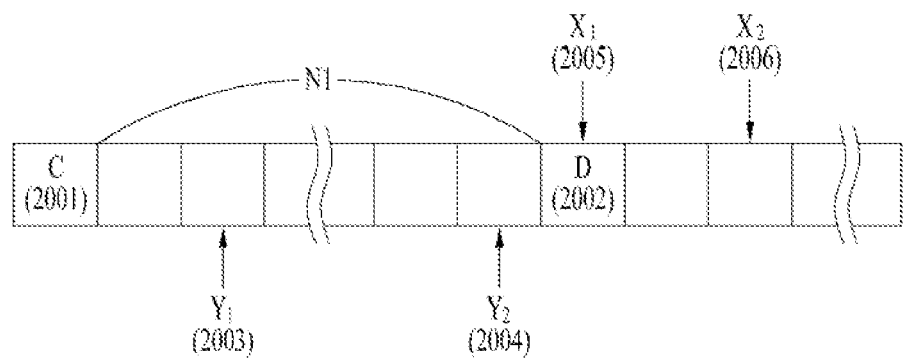

In FIG. 12 (a), a last symbol of the second DL channel (e.g., PDSCH) and a first symbol that satisfies N1 are defined as symbol A (1001) and symbol B (1002), respectively.

Assuming that one candidate symbol configured for UL transmission is symbol Y (1003), symbol Y (1003) does not satisfy N1.

When N1 is not satisfied, the UE may perform the LBT for symbol Y (1003). If the LBT is successful, the UE may transmit the PUCCH including the NACK in symbol Y (1003) (Option 1-1-A). Alternatively, the UE may drop feedback transmission in response to the PDSCH reception without performing the LBT (Option 1-2-A).

Assuming that the one candidate symbol configured for the UL transmission is symbol X (1004), symbol X (1004) satisfies N1.

When N1 is satisfied, the UE may perform the LBT for symbol X (1004). If the LBT is successful, the UE may transmit the PUCCH including the HARQ-ACK feedback based on decoding results of the PDSCH (Option 1-1-B or 1-2-B).

In FIG. 12 (b), a last symbol of the second DL channel (e.g., PDSCH) and a first symbol that satisfies N1 are defined as symbol C (2001) and symbol D (2002), respectively.

Symbols Y1 (2003), Y2 (2004), X1 (2005), and X2 (2006) may be consecutive or not.

Assuming that a plurality of candidate symbols configured for UL channel transmission are symbols Y1 (2003) and Y2 (2004), both symbols Y1 (2003) and Y2 (2004) do not satisfy N1.

When N1 is not satisfied, the UE may perform the LBT sequentially from symbol Y1 (2003) and then transmit the PUCCH including the NACK in a symbol where the LBT is successful. Alternatively, the UE may drop feedback transmission in response to the PDSCH reception without performing the LBT (Option 2-1-A, 2-2-B, or 2-3-B).

Assuming that the plurality of candidate symbols configured for the UL channel transmission are symbols X1 (2005) and X2 (2006), both symbols X1 (2005) and X2 (2006) satisfy N1.

When all candidate symbols satisfy N1, the UE may perform the LBT sequentially from symbol X (2005) and then transmit the PUCCH including the HARQ-ACK feedback in a symbol where the LBT is successful (Option 2-1-B).

Some of the plurality of candidate symbols configured for the UL channel transmission may satisfy N1. For example, when the plurality of candidate symbols are symbols Y1 (2003), Y2 (2004), X1 (2005), and X2 (2006), symbols Y1 (2003) and Y2 (2004) do not satisfy N1, but symbols X1 (2005) and X2 (2006) satisfy N1.

The UE may perform the LBT only for symbols X1 (2005) and X2 (2006) that satisfy N1 and then transmit the PUCCH including the HARQ-ACK feedback in a symbol where the LBT is successful. For example, when the LBT is unsuccessful in symbol X1 (2005) but successful in symbol X2 (2006), the UE may transmit the PUCCH including the HARQ-ACK feedback in symbol X2 (2006) (Option 2-2-A).

The UE may perform the LBT for all candidate symbols including not only symbols X1 (2005) and X2 (2006) but also symbols Y1 (2003) and Y2 (2004) that do not satisfy N1.

If the LBT is successful for symbol Y1 (2003) that does not satisfy N1, the UE may not start the PUCCH transmission in symbol Y1 (2003) because symbol Y1 (2003) does not satisfy N1. Thus, the UE may transmit a channel reservation signal in symbol Y1 (2003). The channel reservation signal is transmitted until the earliest symbol that satisfies N1, symbol X1 (2005). The PUCCH transmission including the HARQ-ACK feedback may start in symbol X1 (2005) (Option 2-3-A).

Processing Time and UE Operation for PUSCH Transmission

Hereinafter, a description will be given of how the UE operates when one or more candidate transmission starting symbols are configured for PUSCH transmission in the U-band. In this case, the candidate transmission starting symbol may be predefined with respect to a PUSCH starting symbol or indicated by a higher layer signal (e.g., RRC signal) or UL scheduling information.

First, when one transmission starting symbol is configured for the PUSCH transmission, the following options may be considered for an N2 processing time check and UE operation method.

1) Option 3

A. When the configured transmission starting symbol does not satisfy N2, the UE may be configured to discard the UL grant PDCCH. Thus, the UE may perform no LBT and drop the PUSCH transmission for the UL grant PDCCH.

B. When the configured transmission starting symbol satisfies N2, the UE may be configured to perform the LBT and perform the corresponding PUSCH transmission.

When a plurality of candidate transmission starting symbols are configured for the PUSCH transmission, the following options may be considered for the N2 processing time check and UE operation method.

1) Option 4-1

A. When at least one (or the earliest) candidate transmission starting symbol does not satisfy N2, the UE may discard the UL grant PDCCH and drop the corresponding PUSCH transmission (without performing the LBT).

B. When all candidate transmission starting symbols (or the earliest candidate transmission starting symbol) satisfy N2, the UE may be configured to perform the corresponding PUSCH transmission (by performing the LBT).

2) Option 4-2

A. When at least one (or the latest) candidate transmission starting symbol satisfies N2, the UE may be configured to perform the corresponding PUSCH transmission. For the PUSCH transmission, the UE may perform the LBT only for candidate transmission starting symbol(s) that satisfy N2.

B. When all candidate transmission starting symbols (or the latest candidate transmission starting symbol) do not satisfy N2, the UE may discard the UL grant PDCCH and drop the corresponding PUSCH transmission (without performing the LBT).

3) Option 4-3

A. When at least one (or the latest) candidate transmission starting symbol satisfies N2, the UE may be configured to perform the corresponding PUSCH transmission. For the PUSCH transmission, the UE may perform the LBT for all candidate transmission starting symbols including candidate transmission starting symbol(s) that do not satisfy N2. If the UE succeeds in the LBT for the candidate transmission starting symbol(s) that do not satisfy N2, the UE may transmit a channel reservation signal from the time at which the LBT is successful to the earliest starting symbol that satisfies N2, symbol X. Then, the UE may start the PUSCH transmission from symbol X.

B. When all candidate transmission starting symbols (or the latest candidate transmission starting symbol) do not satisfy N2, the UE may discard the UL grant PDCCH and drop the corresponding PUSCH transmission (without performing the LBT).

A starting symbol corresponding to the reference of rate-matching for generation of a PUSCH transmission signal (e.g., encoded bits) may i) be determined as the earliest symbol among the candidate transmission starting symbols, ii) be determined as the earliest candidate transmission starting symbol that satisfies N2, or iii) be directly indicated by UL grant DCI (for example, it may be directly indicated which one of the candidate transmission starting symbols is determined as the starting symbol).

Processing Time and UE Operation for CSI Report Transmission

A minimum time required for CSI feedback preparation may be defined. The minimum processing time required for the CSI feedback preparation may be named N3. N3 may be defined as a minimum time interval (e.g., the number of symbols) between reception of DCI/PDCCH triggering CSI report transmission (reception of the last symbol) and/or reception of a DL RS in which CSI measurement will be performed (reception of the last symbol) and transmission of a CSI reporting PUCCH/PUSCH therefor (transmission of the starting symbol of the corresponding channel or the starting symbol in/to a CSI signal is transmitted/mapped on the corresponding channel).

When N3 is not satisfied (that is, when an interval between the last symbol of the DCI PDCCH or DL RS and the CSI (PUCCH/PUSCH) transmission starting symbol is less than N3), the UE may be configured to transmit an invalid CSI report (e.g., CSI feedback which has not been updated or previously/recently reported) (via a scheduled/indicated PUCCH/PUSCH). Alternatively, when N3 is not satisfied, the UE may be configured to drop the CSI report transmission.

Hereinafter, a description will be given of how the UE operates when one or more candidate transmission starting symbols are configured for CSI (PUCCH/PUSCH) transmission in the U-band.

First, when only one transmission starting symbol is configured for the CSI (PUCCH/PUSCH) transmission, the following options may be considered for an N3 processing time check and UE operation method.

1) Option 5-1

A. When the configured transmission starting symbol does not satisfy N3, the UE may perform the LBT. If the LBT is successful, the UE may transmit invalid CSI (e.g., non-updated or last-reported CSI). On the contrary, if the LBT is unsuccessful, the UE may drop the invalid CSI transmission. When aperiodic CSI transmission is indicated by the PDCCH, the corresponding PDCCH may be discarded to skip unnecessary CSI measurement/calculation.

B. When the configured transmission starting symbol satisfies N3, the UE may be configured to perform the LBT and transmit valid CSI. Specifically, the UE may perform the LBT for the transmission starting symbol. If the LBT is successful, the UE may start the CSI transmission in the transmission starting symbol. On the contrary, if the LBT is unsuccessful, the UE may drop the CSI transmission.

2) Option 5-2

A. When the configured transmission starting symbol does not satisfy N3, the UE may not perform the LBT for the transmission starting symbol. Accordingly, the UE may be configured to drop the corresponding CSI (PUCCH/PUSCH) transmission.

B. When the configured transmission starting symbol satisfies N3, the UE may be configured to perform the LBT and transmit the valid CSI. Specifically, the UE may perform the LBT for the transmission starting symbol. If the LBT is successful, the UE may start the CSI transmission in the transmission starting symbol. On the contrary, if the LBT is unsuccessful, the UE may drop the CSI transmission.

When a plurality of candidate transmission starting symbols are configured for the CSI (PUCCH/PUSCH) transmission, the following options may be considered for the N3 processing time check and UE operation method.

1) Option 6-1

A. When at least one (or the earliest) candidate transmission starting symbol does not satisfy N3, the UE may i) perform the LBT and transmit the invalid CSI (e.g., non-updated or last-reported CSI) or ii) drop the CSI (PUCCH/PUSCH) transmission without performing the LBT. Specifically, in case i), if the LBT is successful for the symbol candidate that does not satisfy N3, CSI measurement/calculation may be unnecessary. Thus, if any one candidate symbol does not satisfy N3, the UE may skip the CSI measurement/calculation and transmit only the invalid CSI to reduce UE complexity/power consumption.

A. All candidate transmission starting symbols (or the earliest candidate transmission starting symbol) satisfy N3, the UE may be configured to perform the LBT and transmit the valid CSI. Specifically, the UE may perform the LBT sequentially for every candidate symbol from the first candidate symbol until the LBT is successful. If the LBT is successful for a candidate symbol, the UE may start the CSI (PUCCH/PUSCH) transmission from the symbol where the LBT is successful. On the other hand, if the LBT is unsuccessful for all candidate symbols, the UE may drop the CSI transmission.

2) Option 6-2

A. At least one (or the latest) candidate transmission starting symbol satisfies N3, the UE may be configured to transmit the valid CSI. To transmit the CSI (PUCCH/PUSCH), the UE may perform the LBT only for candidate transmission starting symbol(s) that satisfy N3. In other words, the UE may skip the LBT for candidate symbol(s) that do not satisfy N3.

B. When all candidate transmission starting symbols (or the latest candidate transmission starting symbol) do not satisfy N3, the UE may be configured to i) perform the LBT and transmit the invalid CSI (e.g., non-updated or last-reported CSI) or ii) drop the CSI (PUCCH/PUSCH) transmission without performing the LBT.

3) Option 6-3

A. At least one (or the latest) candidate transmission starting symbol satisfies N3, the UE may be configured to transmit the valid CSI. To transmit the CSI (PUCCH/PUSCH), the UE may perform the LBT for all candidate transmission starting symbols including candidate transmission starting symbol(s) that do not satisfy N3. If the UE succeeds in the LBT for the candidate transmission starting symbol(s) that do not satisfy N3, the UE may transmit a channel reservation signal from the time at which the LBT is successful to the earliest symbol that satisfies N3, symbol X. Then, the UE may start the CSI (PUCCH/PUSCH) transmission from symbol X.

B. All candidate transmission starting symbols (or the latest candidate transmission starting symbol) satisfy N3, the UE may be configured to i) perform the LBT and transmit the invalid CSI (e.g., non-updated or last-reported CSI) or ii) drop the CSI (PUCCH/PUSCH) transmission without performing the LBT.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 13:
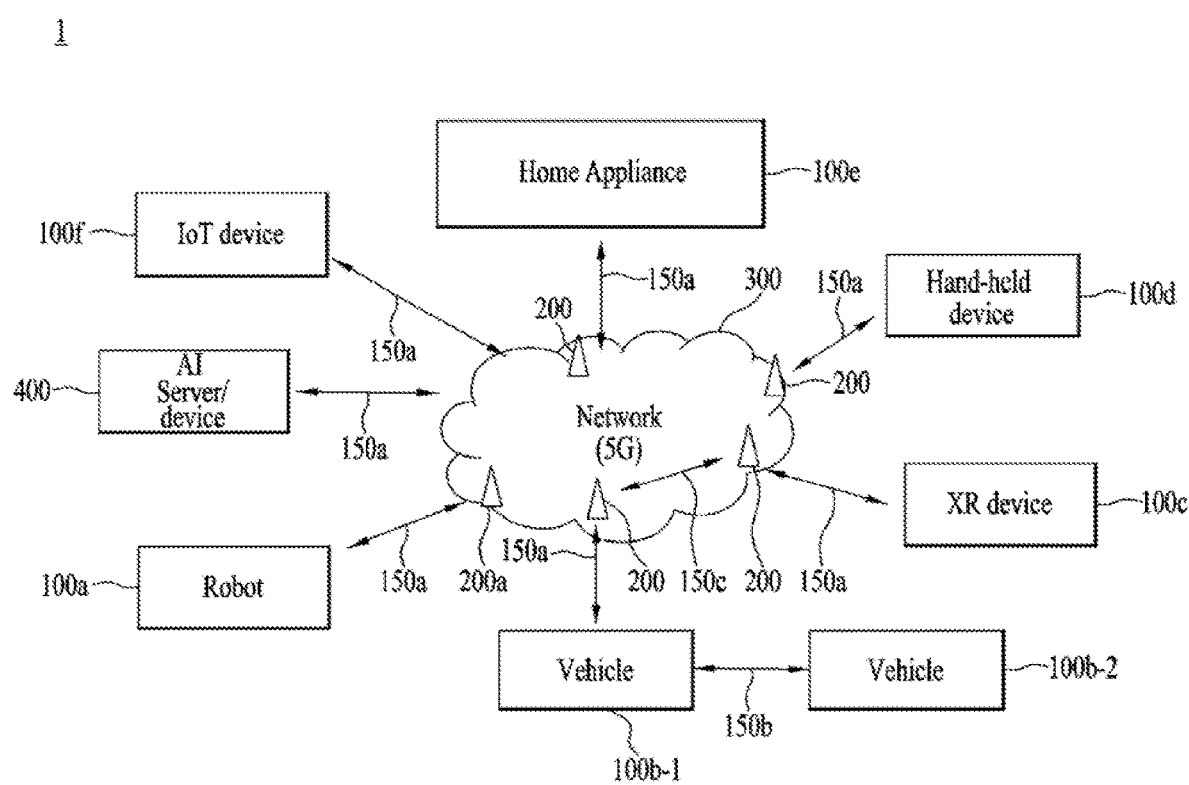
FIG. 13 illustrates an exemplary communication system applied to the present disclosure.

FIG. 13 illustrates a communication system 1 applied to the present disclosure.

Referring to FIG. 13, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don on various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 14:
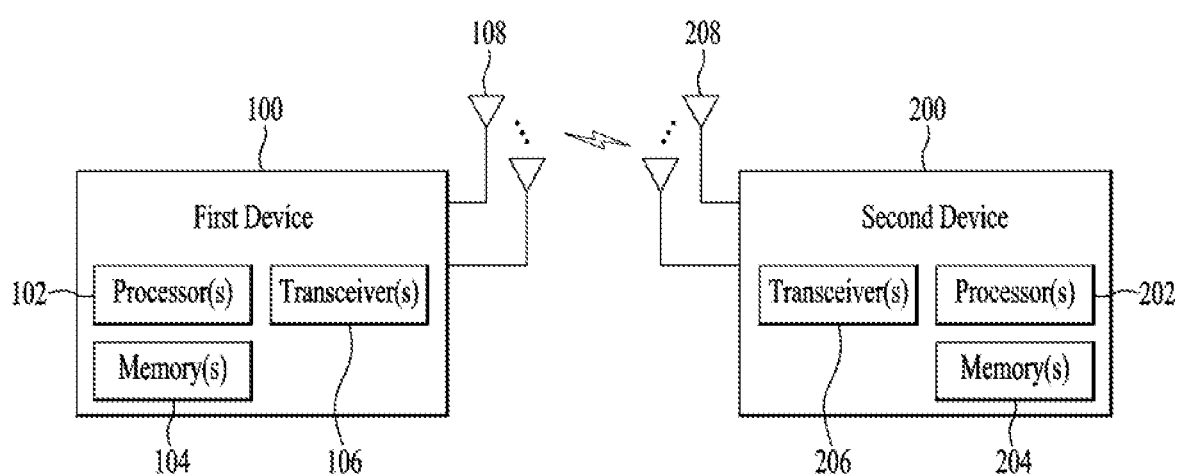
FIG. 14 illustrates an exemplary wireless device applicable to the present disclosure.

FIG. 14 illustrates wireless devices applicable to the present disclosure.

Referring to FIG. 14, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

For example, the processors 102 and 202 of the wireless devices 100 and 200 may be configured to receive a first DL channel including DL assignment information through the transceiver 106 and 206, receive a second DL channel including data based on the DL assignment information, and transmit a response to the reception of the second DL channel via a UL channel by performing channel sensing for one or more candidate symbols configured for UL transmission.

Figure 15:
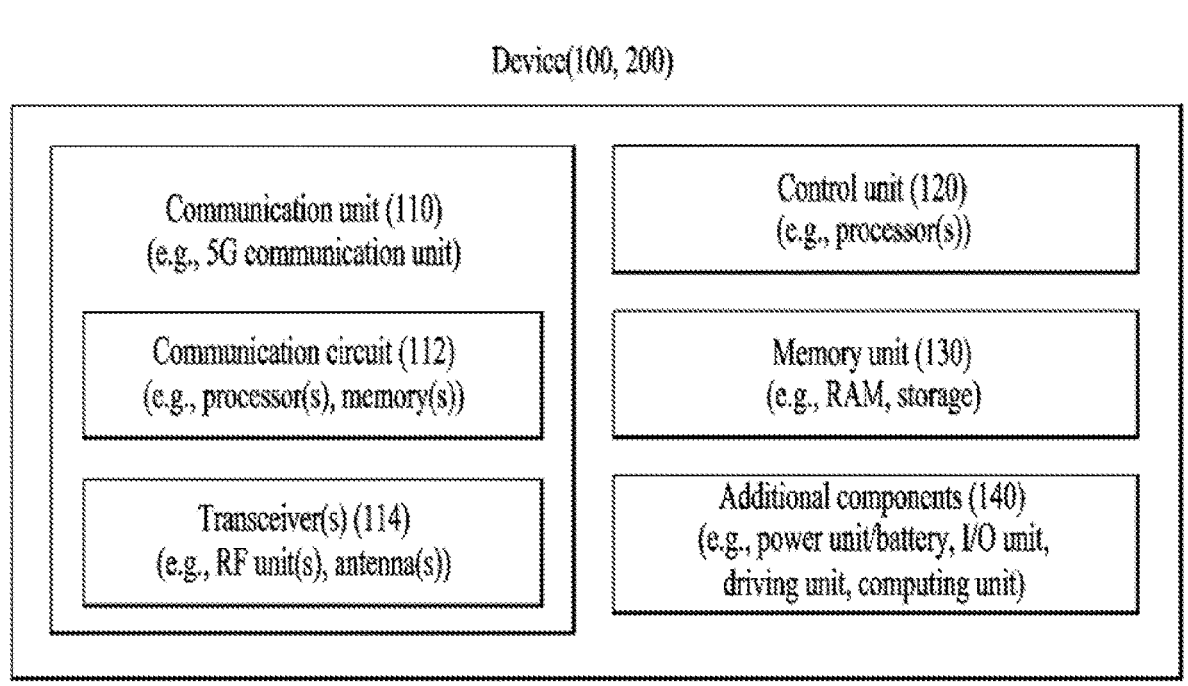
FIG. 15 illustrates another exemplary wireless device applicable to the present disclosure.

FIG. 15 illustrates another example of a wireless device applied to the present disclosure. The wireless device may be implemented in various forms according to a use case/service (refer to FIG. 13).

Referring to FIG. 15, wireless devices 100 and 200 may correspond to the wireless devices 100 and 200 of FIG. 13 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcasting terminal, a hologram device, a public safety device, an MTC device, a medical device, a FinTech device (or a finance device), a security device, a climate/environment device, the AI server/device (400 of FIG. 14), the BSs (200 of FIG. 14), a network node, or the like. The wireless device may be mobile or fixed according to a use case/service.

In FIG. 15, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 16:
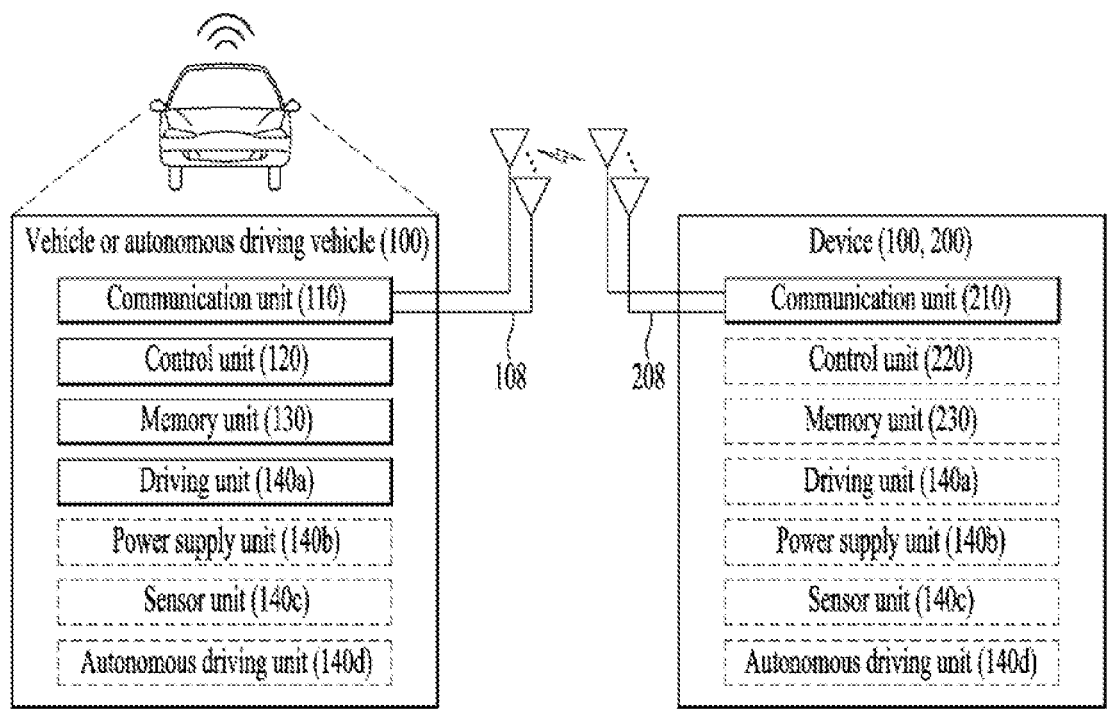
FIG. 16 illustrates an exemplary vehicle or autonomous driving vehicle applicable to the present disclosure.

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other devices in a wireless mobile communication system.

The invention claimed is:

1. An apparatus in a wireless communication system, the apparatus comprising:
a memory; and
a processor, the processor is configured to:
receive a Physical Downlink Control Channel (PDCCH) including Downlink Control Information (DCI);
receive a Physical Downlink Shared Channel (PDSCH) based on the DCI;
determine candidate transmission symbols for transmitting a Physical Uplink Control Channel (PUCCH); and
based on at least one symbol of the candidate transmission symbols being located after N1 symbols from a last symbol of the PDSCH:
sense only the at least one symbol; and
transmit, through the at least one symbol, the PUCCH including a Hybrid Automatic Repeat reQuest-Acknowledgment (HARQ-ACK) which is determined as an ACK or a negative ACK (NACK) based on decoding result of the PDSCH;

based on all of the candidate transmission symbols being not located after the N1 symbols from the last symbol of the PDSCH:

sense all of the candidate transmission symbols; and transmit, through the candidate transmission symbols, the PUCCH including a HARQ-ACK which is determined as the NACK regardless of the decoding result of the PDSCH.

2. The apparatus of claim 1, wherein the apparatus includes an autonomous driving vehicle configured to communicate with at least one of a terminal, a network, or other autonomous driving vehicles other than the apparatus.

* * * * *